United States Patent [19]
Chapuis et al.

[11] Patent Number: 6,023,267
[45] Date of Patent: *Feb. 8, 2000

[54] PROCESS FOR SELECTING PROGRAMES, ESPECIALLY TELEVISION PROGRAMES AND DEVICE AND GRAPHICAL INTERFACE IMPLEMENTING THIS PROCESS

[75] Inventors: Laurent Chapuis; Nathalie Gonzales, both of Paris, France

[73] Assignee: Thomson multimedia SA, France

[*] Notice: This patent issued on a continued prosecution application filed under 37 CFR 1.53(d), and is subject to the twenty year patent term provisions of 35 U.S.C. 154(a)(2).

[21] Appl. No.: 08/892,765

[22] Filed: Jul. 15, 1997

[30] Foreign Application Priority Data

Jul. 31, 1996 [FR] France .................. 96 09679

[51] Int. Cl.$^7$ .................................. H04N 7/14
[52] U.S. Cl. ..................... 345/327; 348/13; 348/906; 345/145; 345/353
[58] Field of Search ............... 348/906, 569, 348/12, 13; 345/327, 563, 353

[56] References Cited

U.S. PATENT DOCUMENTS

| | | | |
|---|---|---|---|
| 5,485,175 | 1/1996 | Suzuki ................................. | 345/353 |
| 5,585,838 | 12/1996 | Lawler et al. ..................... | 348/12 |
| 5,623,613 | 4/1997 | Rowe et al. ....................... | 395/353 |
| 5,666,504 | 9/1997 | Crutcher ............................ | 345/355 |
| 5,689,668 | 11/1997 | Beaudot et al. .................. | 345/353 |
| 5,704,051 | 12/1997 | Lane et al. ....................... | 345/353 |
| 5,708,787 | 1/1998 | Nakano et al. .................. | 345/353 |
| 5,731,844 | 3/1998 | Rauch et al. ..................... | 348/569 |
| 5,751,373 | 5/1998 | Ohyama et al. ................. | 348/569 |
| 5,752,160 | 5/1998 | Dunn ................................ | 348/12 |
| 5,793,438 | 8/1998 | Bedard .............................. | 348/569 |

FOREIGN PATENT DOCUMENTS 0721253   7/1996   European Pat. Off. .
WO95/32583   11/1995   WIPO .

OTHER PUBLICATIONS (Microsoft Windows & MS–DOS User's Guide; pp. 17–21), 1993.

Brugeliera, Digital On–Screen Display a New Technology for the Consumer Interface, Cable TV Sessions, Montreux Jun. 10–15, 1993, Symp 18, pp. 571–586.

*Primary Examiner*—Andrew I. Faile
*Assistant Examiner*—Reuben M. Brown
*Attorney, Agent, or Firm*—Joseph S. Tripoli; Peter M. Emanuel; Frank Y. Liao

[57] ABSTRACT

A process for selecting events, especially television programs and device and graphical interface implementing this process, including a transmission of service information. According to this process, at least two one-dimensional parallel lists of items are displayed, the first list of items (3) containing events, the second one-dimensional list of items (2) containing at least one function for filtering events and/or at least one function capable of acting on said events. The process furthermore includes the step of picking out selected items, a single item being selected from each list, another item being selectable from a list simply by placing a single cursor over said other item, a selected item remaining selected when said cursor is moved off the list containing this selected item.

12 Claims, 6 Drawing Sheets

6,023,267

PROCESS FOR SELECTING PROGRAMES, ESPECIALLY TELEVISION PROGRAMES AND DEVICE AND GRAPHICAL INTERFACE IMPLEMENTING THIS PROCESS

BACKGROUND OF THE INVENTION

1. Field of the Invention

The invention relates to a process for selecting programmes in a television system including a transmission of service data. The invention also relates to a device and a graphical interface of a programme guide implementing this process. The invention applies in particular in the field of the transmission of television programmes and service information within the framework of the DVB ("Digital Video Broadcast") standard.

2. Description of the Related Art

The availability of information on the content of programmes ("events") transmitted multiplexed with the programmes themselves requires the implementation of a programme guide, that is to say a textual and graphical interface through which the user can access this information.

Now, while there are numerous examples of tools for harnessing a computerized database, such tools applied to television are rare. Thus, the constraints within the context of television are rather particular: the user is relatively far from the screen, thus implying diminished legibility of the information on the screen, and generally has available only a relatively simple browsing tool such as a remote control which is less flexible than a mouse within the framework of a graphical-area application.

The purpose of the invention is to propose a process for selecting programmes and a device for implementation having innovative characteristics which take into account in particular the constraints mentioned above.

SUMMARY OF THE INVENTION

The subject of the invention is a process for selecting events in a television system including a transmission of service information, characterized in that it comprises the steps:

of displaying a first one-dimensional list of items (3) containing events, of displaying a second one-dimensional list of items (2) in parallel with the first list (3) and containing at least one function for filtering events and/or at least one function capable of acting on said events, of picking out a single so-called selected item from each list, another item being selectable from a list simply by placing a single cursor over said other item, a selected item remaining selected when said cursor is moved off the list containing this selected item.

In accordance with the invention, a graphical recall of the browsing "route" through a menu is given to the user. The menus are organized in such a way as to present lists of functions or of events. Each list possesses a so-called selected item which corresponds to the last item of the list which bore the single cursor. When passing from one list to another (for example with the aid of the left/right keys of a remote control if the lists are vertical), an item remains selected from each list, without the user having to employ keys other than the direction keys. In particular, it is not necessary, as regards the selection of an item, to confirm this selection with the help of an additional enter key, this selection being automatically maintained when the cursor is moved to another list. The enter key is employed only when activating an item.

According to a variant embodiment, a graphical link is displayed between two selected items from two adjacent lists.

According to a variant embodiment, the movement of the cursor from a start list to a destination list brings about the positioning by default of this cursor over the most recently selected event from the destination list.

It is thus assumed that the most recently selected item of a list is that which a priori presents the greatest immediate interest to the user. Therefore, the cursor is automatically positioned over the selected item from a list when this cursor is moved to this list. This allows, as the case may be, immediate activation of this item by the user.

According to a variant embodiment, an item is activated with the help of an enter key.

According to a particular embodiment, the event on which a function capable of acting on an event acts following a step of activation of this function is the event selected from the first list.

According to the example embodiment described below, two lists are displayed, a first of functions and a second of events. The user selects an event from the list of events, then moves the cursor to the list of functions so as to select therefrom and then to activate a function therefrom. This function, in the case involving a function which can act directly on an event (such as the "Record" function or the "Display complementary information" function) is then applied to the event selected earlier. Activation of the event not being necessary, the application of the function to this event requires fewer actions on the part of the user.

The invention is of course not limited to two lists.

According to a variant embodiment, the process in accordance with the invention also comprises the step of activation of an event, this activation triggering the displaying of a menu of functions capable of acting on said event.

According to a variant embodiment, the function or functions capable of acting on the events comprise one or more from among the following functions: Record, Display complementary information, Turn-on, Storage in a recall list.

According to a variant embodiment, an active state of a function of toggle type is recalled by the displaying of an icon near the event.

According to a variant embodiment, the label displayed on screen of a function of toggle type varies as a function of its state.

According to a variant embodiment, the events with which a function of toggle type in the active state is associated are stored in a third list.

According to a variant embodiment, only the value of a filtering function is displayed, with the exception of its generic denomination.

The subject of the invention is also a device for reception in a television system including the transmission of service information, characterized in that it comprises:

means of reception of service information, especially information relating to events, from a data stream, means of displaying a programme guide containing a first one-dimensional list of items containing events and a second one-dimensional list of items in parallel with the first list and containing at least one function for filtering events and/or at least one function capable of acting on said events, means of control of a single cursor with a view to the selection of items by placing said cursor over an item, each list containing a single so-called selected item, means of displaying a signalling of the selected items, the selection of an item from a given list being maintained when said cursor is moved off this given list.

The subject of the invention is also a graphical interface for programme guide in a television system including the transmission of service information, said interface being displayed on a viewing screen, characterized in that it comprises a graphical work area containing a zone for displaying a first one-dimensional list of items containing events, a zone for displaying a second one-dimensional list of items in parallel with the first list and containing at least one function for filtering events and/or at least one function capable of acting on said events, said interface furthermore comprising a single cursor able to select a function or an event on positioning said cursor thereat with the help of direction keys, and means of displaying a signalling of a single selected item from each list of items, the selection of an item from a given list being maintained when said cursor is moved off this given list.

The various functions can be accessed either through the menu displayed on the screen, or through specific keys of the remote control, when they exist: it is thus possible to adapt more or less complex remote controls to the device and process in accordance with the invention.

According to a variant embodiment, the lists are one-dimensional and arranged in parallel.

According to a variant embodiment, the cursor is symbolized graphically by a token displayed near the corresponding item.

BRIEF DESCRIPTION OF THE DRAWINGS

Other characteristics and advantages of the invention will emerge through the description of a particular non-limiting example embodiment. The appended figures illustrate this example embodiment. Among these figures.

DETAILED DESCRIPTION OF THE INVENTION

The remote control used to implement the programme guide according to the present example embodiment of the invention includes the following keys:

four direction keys (Up, Down, Left, Right) ('↑ ↓ ← →')

an Enter key ('OK')

a Guide key a Menu key an Information key ('Info')

an Exit key two keys for programme incrementation, respectively decrementation P+ and P− a numeric pad containing the keys from 0 to 9

According to a variant embodiment, the remote control also includes a Return key which makes it possible to go back up one level in the tree of menus.

According to the present example embodiment, the programme guide is used in a DVB (standing for "Digital Video Broadcast") digital television transmission environment. The DVB standard associated with the MPEG II Systems standard defines the format of the so-called "Information Service" data which may be transmitted. Reference may be made to these documents for further details on the packeting and multiplexing of data relating to the programme guide.

The physical support for the programme guide in accordance with the present example embodiment is a DVB digital decoder such as that manufactured and sold by the Applicant at the date of the present Patent Application. The character generator used for the present example is an ST3520 circuit manufactured by SGS Thomson.

Figure 6:
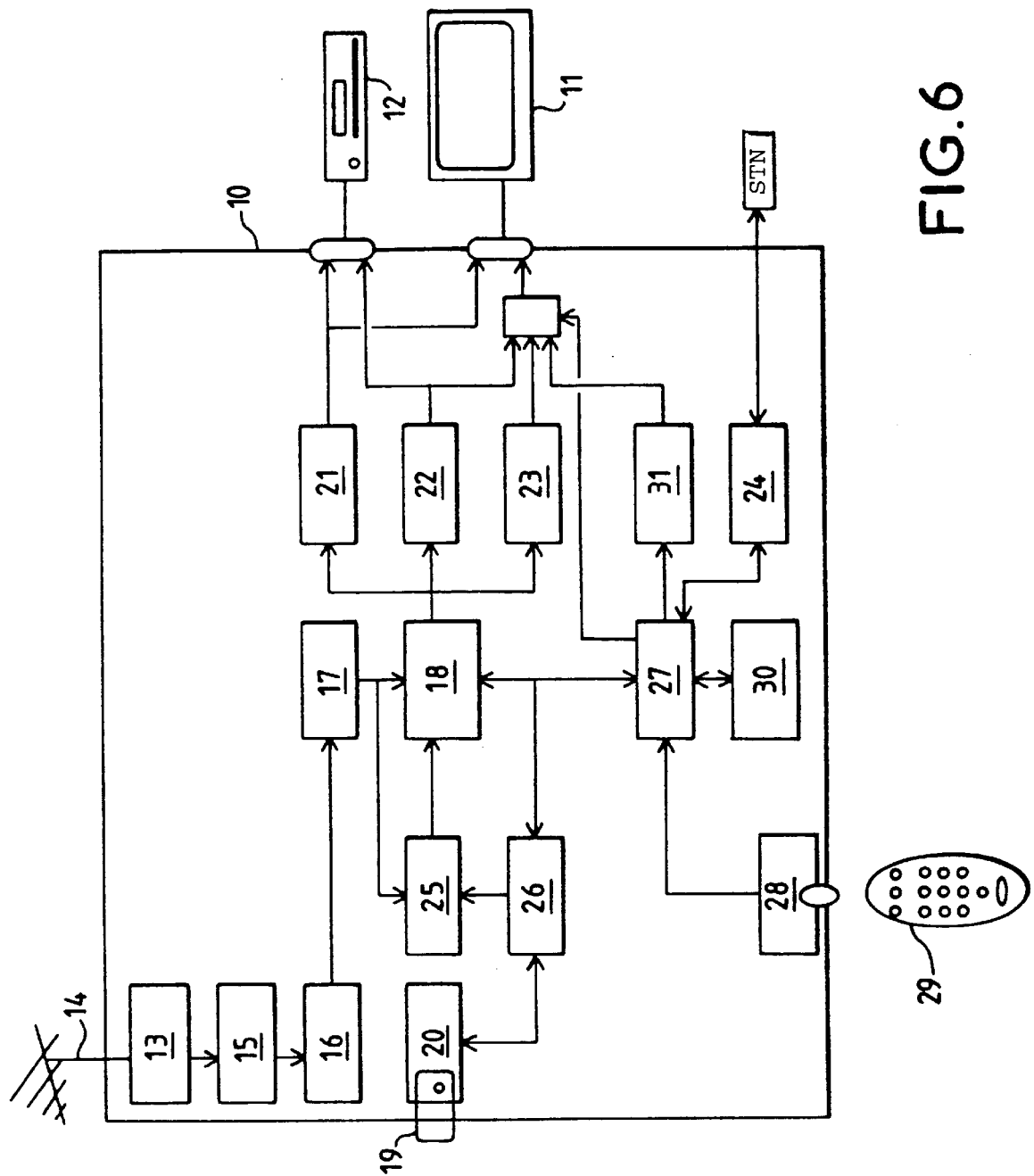
FIG. 6 represents a block diagram of a decoder in accordance with the present example embodiment.

FIG. 6 is a block diagram of a decoder implementing the programme guide described below. The items described in relation with FIG. 6 should not be taken as limiting the invention as claimed.

The decoder 10 is connected to a television receiver 11 through a TV peripheral socket (also termed a SCART socket), to a video recorder 12 likewise through a TV peripheral socket and to the switched telephone network through a modem 24.

The decoder comprises a tuner 13 linked to a frequency converter of an antenna 14. The tuner 13 is connected to an error correction circuit 16 through a demodulator 15. The output of the error correction circuit is linked to a demultiplexer 17. This demultiplexer separates the various data packets according to their content and transmits them to the relevant facilities via a buffer memory 18. The relevant facilities include among other things an access control module comprising a microchip card 19 inserted into a connector 20, an audio decoder 21, a video decoder 22 and a teletext management circuit 23.

The access control module also includes a descrambler 25, through which any encrypted packet must pass before being stored in the buffer memory 18. The descrambler is managed by a verifier circuit 26 which allows or disallows descrambling depending on the user's access entitlements.

The decoder also comprises a microprocessor 27 linked to an infrared interface 28 capable of receiving signals from a remote control 29. The microprocessor 27 is moreover linked to a memory 30 and to a character generator 31. The memory 30 contains the programmes and data managing the master process of the programme guide described above. The output from the character generator is multiplexed with the output from the video decoder. The multiplexing is controlled by the microprocessor 27.

The microprocessor 27 reads the demultiplexed service data (also known as Service Information) from the buffer memory. These service data correspond to the information on the events described above and such as specified in the corresponding part of the DVB standard.

Figure 1:
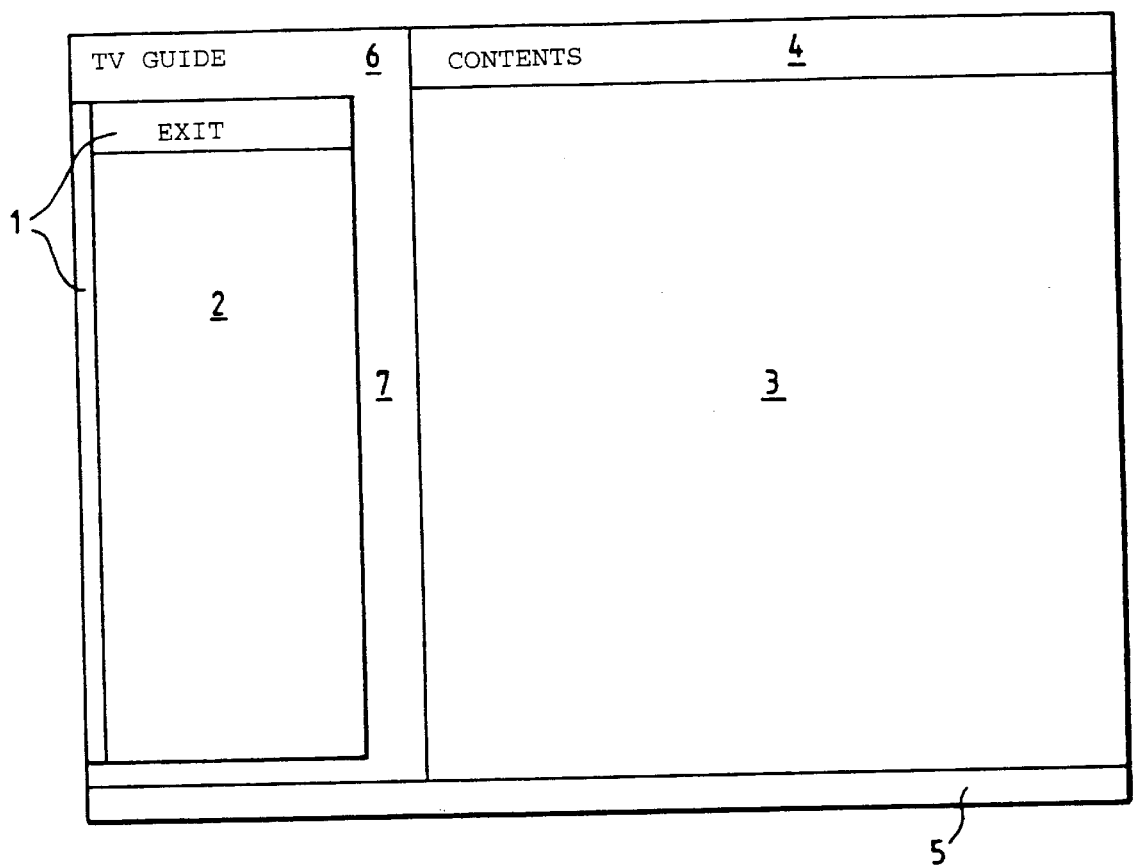
FIG. 1 represents diagrammatically the various zones of a television screen displaying a programme guide in accordance with the present example embodiment.

FIG. 1 represents the organization of the screen of the programme guide. It is quite obvious that the indications of the coordinates do not limit the scope of the invention. According to the present example embodiment, the screen contains 26 lines and 52 columns, the character with coordinates (1,1) being situated at the top left of the screen.

The screen contains seven distinct zones:

The exit zone (zone 1) borders the left part of the screen, where it occupies the rectangles with respective coordinates

[(1;5);(1;24)] and [(1;3);(11;4)]. The first rectangle corresponds to a large part of the first column of the screen. The second rectangle contains the tag "Exit", identifying this zone as the exit zone. The two rectangles possess the same background colour. Their tie-up at the level of characters (1;4) and (1;5) signifies clearly to the user that the same zone is involved.

The two rectangles of the exit zone are displayed only in FIG. 1. In the other figures it is assumed that the exit zone is incorporated entirely into the second zone (control zone) as an additional function.

According to a variant embodiment, when the menu displayed on the screen is not the "Contents" menu, the "Exit" tag is replaced by the "Return" tag, indicating that by activating this function one goes back up a level in the tree of menus. This modification is not illustrated in the diagrams.

The exit zone, once activated, makes it possible to quit the programme guide when in the main menu, or to go back up a level in the tree of menus.

The control zone (zone 2) adjoins the right and bottom sides of the exit zone. It occupies the rectangle with coordinates [(2;5);(14;24)].

According to the present example embodiment, the control zone contains eight control functions, which will be seen in detail later. These control functions can be classed into two categories: event search functions, such as filters, and functions acting on events.

The organization of the control functions inside this zone is vertical, in the form of a stack. Once the cursor has been positioned in this zone, with the aid of the sideways arrows of the remote control, the user selects a function with the help of the "Up" and "Down" keys. (The process for moving the cursor and its graphical echo on the screen will be described later). A selected function is displayed highlighted. To activate a selected function, the user must press the enter key of the remote control. The state of activation of a function is recalled either by displaying a sub-menu (going down one level in the menu tree), or by a change of colour or of appearance of the scroll arrows situated on either side of the event search functions.

The part of the exit zone 1 situated above the control zone 2 forms a ninth function. It can be selected like one of the other eight functions. The exit zone can also be selected by pressing the "Left" key when the cursor is in the control zone. According to a preferred variant embodiment, the exit zone is represented only by said ninth function of the control zone.

The display zone (zone 3) occupies the larger part of the screen, namely the rectangle with coordinates [(18;2); (52;25)]. This rectangle borders the right side of the screen. It contains the list of events proper, such as defined or filtered by the control functions of zone 2.

The top two lines of the display zone can be reserved under certain conditions for displaying the values of the filters. The bottom eight lines of this zone are reserved for displaying complementary information concerning one of the events displayed in the central part of the display zone.

The central part of this zone can display up to seven events, each event occupying two lines. The organization of the events on the screen is vertical, mirroring the control functions of the control zone.

The selection and activation concepts referred to above in respect of the functions of the control zone are also valid in respect of the events displayed in the display zone 3.

It will be noted that the command zone 2 and display zone 3 are arranged horizontally from left to right. The cursor is moved between these zones with the help of the "Left" and "Right" keys of the remote control. The two zones are displayed simultaneously. According to the present example, a part of the exit zone is also aligned with the command and display zones.

The recall zone (zone 4) occupies the rectangle [(18;1); (56;2)]. It contains information such as the title of the menu or sub-menu displayed, the date and also the current time, so that the user can get his bearings easily within the menu tree and when using the various filters.

A help zone (zone 5) occupies the whole of the last line of the screen. It is in this zone that aids regarding the use of the various functions available are displayed. The help is contextual, in the sense that the help message displayed depends on the position of the cursor on the screen and on the actions of the user.

A title zone (zone 6) occupies the rectangle [(1;1);(16;2)]. The title displayed is that of the application currently under use, namely "TV Guide" according to the present example embodiment.

A last zone, the browsing link zone (zone 7), is interposed between the control zone 2 and the display zone 3. Via a graphical link it indicates the control function selected on the control zone side, and the event selected from the display zone. When the cursor is not in one of the two zones, the function or event over which it was last placed remains selected.

The operation and the role of each zone will be seen in greater detail in what follows, along with the description of the various functions.

Browsing within the programme guide is done at two levels, depending on whether a function or an event is or is not activated.

The first level of browsing, corresponding to the movement within the screen of the "Contents" main menu, is used when no function or event is activated. The "Left" and "Right" direction arrows make it possible to move the cursor to one of the zones 1, 2 or 3. The "Up" and "Down" direction arrows make it possible to select a function or an event inside the zone in which the cursor is located. A selected function or event appears highlighted. Browsing according to this first level is therefore done essentially with the help of the four direction keys. The vertical organization of the content of the zones and the horizontal organization of the zones among themselves contributes to simple and very user-friendly browsing.

The second level of browsing is used when a function or an event is activated, this generally being done by pressing the "OK" key of the remote control in respect of the selected functions or events, or by pressing one of the function-specific keys (for example the "Info" key to activate the "More Info" function).

Two cases may arise while activating an event or a function: either a sub-menu is displayed, or the menu remains the same but the keys of the remote control take another function in part. For example, the horizontal scrolling of a list of values of a filter is performed with the help of the left and right arrows, whereas these arrows serve to change zone at the first level of browsing.

The principles of browsing at this level are very similar to those of the first level when the activation triggers the display of a sub-menu. The differences will be seen when describing the corresponding sub-menus.

Figure 2:
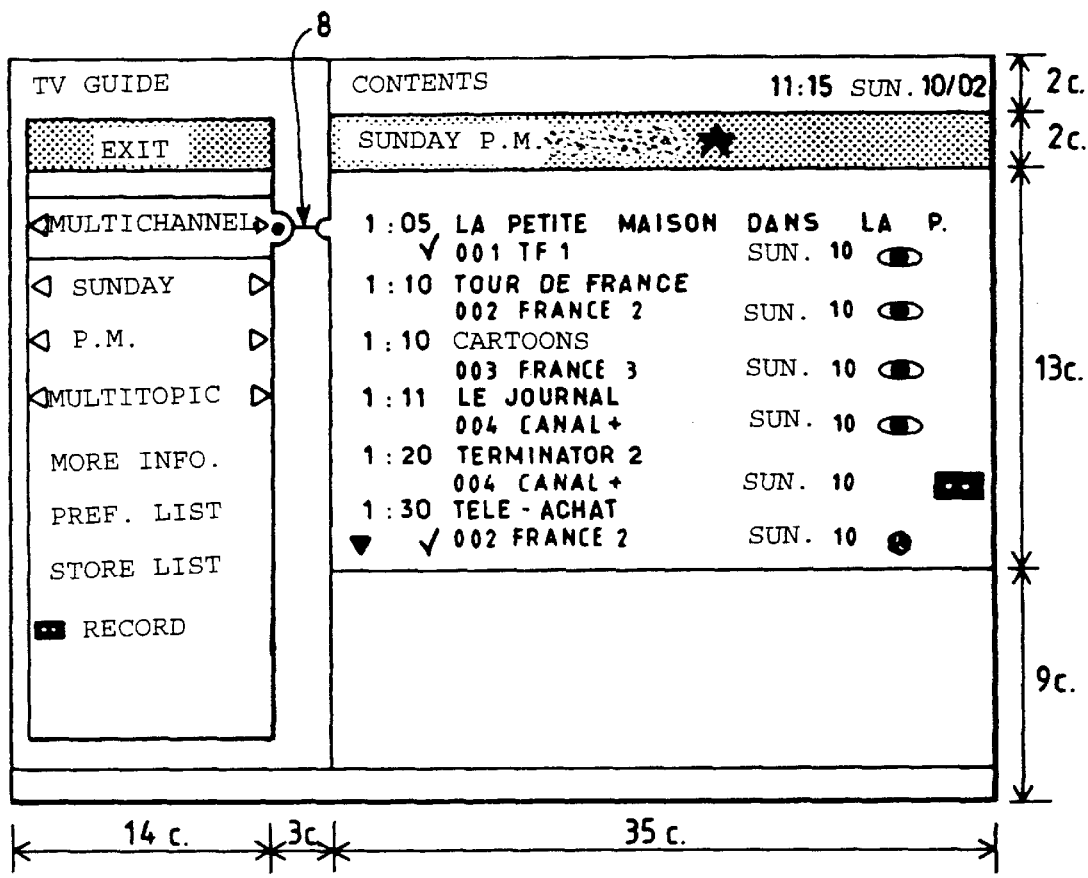
FIG. 2 represents the screen of FIG. 1 such as it appears when the user activates the programme guide (main menu or "Contents" menu)

FIG. 2 illustrates the screen displayed by default when the user runs the programme guide by pressing the "Guide" key of the remote control.

Contents Menu

The menu displayed in the control zone 2 is the "Contents" menu, this being the first-level menu in the menu tree. The title of this menu is recalled in the recall zone 4.

The "Contents" menu comprises the following eight functions: Channel, Day, Period, Topic, More Info, Preferred List, Stored List and Record.

This menu comprises all the options serving to search for events, which will be displayed in the display zone 3. Once the desired events have been obtained, the activating of an event grants access to functions acting on this event. Certain often employed functions acting on the events which are simply selected but not activated are however made available at the same level as the event search functions.

The first four functions in the "Contents" menu are information search functions or else filters. Generally, each filter can be programmed by choosing a value from a list associated with the filter. To programme a filter, the user selects the filter, activates it with the help of the enter key, and scrolls the various values with the help of the "Left" and "Right" keys. The choice of a value is entered by pressing the enter key a second time, or by pressing one of the "Up" or "Down" keys, and the function immediately above or below is selected.

The possibility of scrolling the various values associated with a function is recalled graphically with the help of left and right scrolling arrows placed around the active value of each function. The colour (or the appearance, according to a variant) of these arrows changes if a function is activated. The scrolling of the values is looped.

According to a variant embodiment, the name of the filtering functions is not displayed; the term "day" for example never appearing on the screen. It is directly by way of the filtering value itself that its function is identified. On seeing the terms "Monday" or "Sunday" or else "Multiday", the function is nevertheless easily identified.

This process therefore allows a saving of space at screen level. The legibility of the characters, involving in particular their size, prevents too large a density on the screen.

Contents Menu—"Channel" Function

The "Channel" search function allows filtering by the name or number of the channel. It is the function chosen by default when the programme guide is run. The default value is the "Multichannel" value. No filter is then applied and all the events corresponding to the other three filters are displayed, without differentiating according to channel.

Each channel possesses a number and a title. The channels are scrolled in ascending or descending numerical order.

When this function is activated, the user can also choose a channel by inputting just the channel number.

According to a variant embodiment, the keys pressed by the user are displayed on the screen, in the help zone, for the purpose of avoiding typing errors.

Contents Menu—"Day" Function

The "Day" search function allows filtering according to the day of programming of an event. The operation of this filter is very similar to what has been stated concerning the "Channel" function.

Seven values are possible, corresponding to each day of the week. The choice displayed by default is the current day.

According to a variant embodiment, a day can also be chosen by giving a digit from 1 to 7, where 1 represents Monday. This possibility is less important than for the channels, given the restricted number of values. Nevertheless, a proficient user will save time by using this variant.

Contents Menu—"Period" Function

The "Period" search function makes it possible to refine the by-day search by specifying the time of day. Once again, horizontal scrolling of the values is performed. These values are four in number: Morning (from 6h00 to 12h59), Afternoon (from 13h00 to 19h49), Evening (from 20h00 to 23h59) and Night (from 0h00 to 5h59).

The default period is the current period.

Contents Menu—"Topic" Function

The last search function according to the present example embodiment is the filter based on event topic. The default value is "multitopic" (no filtering by topic). The other values are: Films, Information, Sport, Younger viewers, Music, Arts and Culture and lastly Shows.

When the topic of an event is not defined by its broadcaster, or when this topic does not come within any of the categories, it then appears only if the "Multitopic" value is selected.

According to a variant, a special "Unclassified" category makes it possible to filter all the events not coming within any of the predefined categories.

When the value of a filter is modified and entered, the display zone is updated as quickly as possible.

It is quite obvious that the invention is not limited to the use of the four search functions explicitly referred to above: a larger (or smaller) number of search functions may be used. However, the number of search functions should not increase to the detriment of simplicity of use.

Contents Menu—"Preferred List" Sub-Menu

Figure 3:
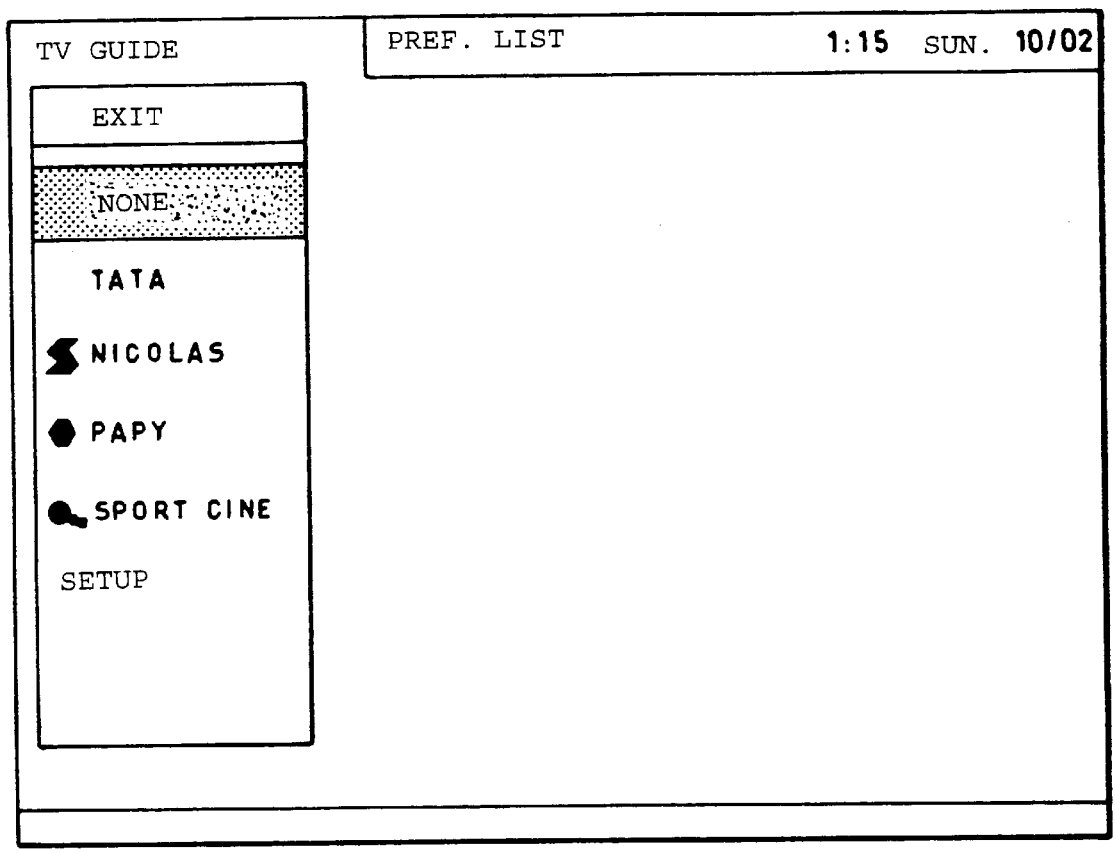
FIG. 3 represents diagrammatically the appearance of the screen corresponding to a first sub-menu of the main menu (preferred list function)

The "Preferred List" function is also a search function, but activating it, unlike in the case of the four functions presented above, grants access to a sub-menu (second level of the menu tree) illustrated by FIG. 3.

This function makes it possible to define and apply filters associated with different users or with different interests.

The sub-menu contains two options ("None" and "Setup") as well as a certain number of "lists" in the form of predefined filters. The options and the lists are organized vertically, in a similar manner to the contents menu. The exit zone takes the same form as before.

Activation of the exit zone in one of the ways already explained makes it possible to return to the contents menu without modifying the values of the filters.

Activation of the "None" option, which is the option selected by default when this sub-menu is open, makes it possible to return to the contents menu of FIG. 2, the four filters of this menu having been reset to their default state. On reverting to the contents menu, the "Preferred List" function is selected by default.

Activation of one of the lists ('TATA', 'NICOLAS', 'PAPY', 'SPORT CINE' in FIG. 3) also makes it possible to return to the contents menu, the filters being programmed as defined by these lists.

Activation of the "Setup" option grants access to the list creation menu (third level in the menu tree). This list creation menu is not illustrated. It makes it possible to choose the values corresponding to each of the first four filters and to associate a list name with this choice. According to a variant of the present example embodiment, unlike in the case of the contents menu, it is possible to combine several values, such as for example several topics, subtopics, or several channels.

Display of Events

Before seeing in detail the other functions of the control zone of the "Contents" menu (FIG. 2), we shall describe the operation of the display zone 3. Thus, as mentioned previously, the other functions make it possible to act on the events displayed in the display zone. Functions which are less often employed and can be reached through the events themselves will be dealt with immediately afterwards.

What follows still refers to FIG. 2.

The display zone 3 contains six events if the first two lines are occupied by the double-height display of the values of the filters. Otherwise, seven events are displayed. The values of the filters are displayed on modifying one of the values, when reverting to the contents menu from one of the sub-menus or when the programme guide is activated by the user. In the last case, the current day and period are what are displayed.

When "Multichannel" and "Multitopic" values are chosen, the above are not displayed. According to a variant embodiment, when a preferred list is used for filtering, an identifier (name or icon) of the list is displayed.

Two lines of 35 characters are earmarked for each event.

The first five characters of the first line indicate the start time of the event. They are followed by a space, and then by a title on 29 characters. If the title exceeds 27 characters it is truncated and the twenty-ninth and thirtieth characters are replaced by two dots.

The second line contains the channel number, the channel name, the date of the event and also, according to a variant embodiment, one or more icons from the following: a "Store" icon, a "Current Event" icon, a "Record" icon, a "Turn-on" icon, a "Topic" icon, a "Pay Event" icon and a "Purchased Event" icon.

The "Store" icon indicates whether the event has previously been selected by the user to appear in the storage list (see below).

The "Current Event" icon identifies an event which has started at the present time.

The "Record" icon indicates that the recording of this event, for example by video recorder, was programmed beforehand by the user.

The "Turn-on" icon indicates that this event has been chosen by the user under the "Turn-on" option (see below).

The "Topic" icon, of which there are as many varieties as there are particular topics, indicates the topic of the event.

The "Pay Event" icon indicates that this is an event for which duty must be paid beforehand.

The "Purchased Event" icon replaces the "Pay Event" icon in the case of payment of duty.

The use of icons makes it possible to reduce the number of characters required to provide the user with information concerning the event.

According to a variant embodiment a current event is identified by a special icon.

When there are more than six (or seven) events to be displayed, a downwards pointing arrow situated at the bottom left of the central part of the display zone indicates that scrolling of the list is possible. This scrolling is implemented by pressing the "Down" key of the remote control when the last event of the zone is selected. Similarly, reverse scrolling is implemented.

According to the present example embodiment, the events are catalogued in chronological order.

The last eight lines of the display zone furthermore include the following information relating to the selected event, which is by default the first event in the list:

the topic (in plaintext)

the "Topic" icon (according to the variant mentioned above)

a summary of the event (on 256 characters)

The three functions acting on the events and available after the "Contents" menu are "More Info", "Stored list" and "Record".

Contents Menu—"More Info" Sub-Menu

The "More Info" function is activated either by pressing the "Info" key of the remote control, or by activating an event (by way of the enter key), or by invoking the function of the same name from the "Contents" menu.

Figure 4:
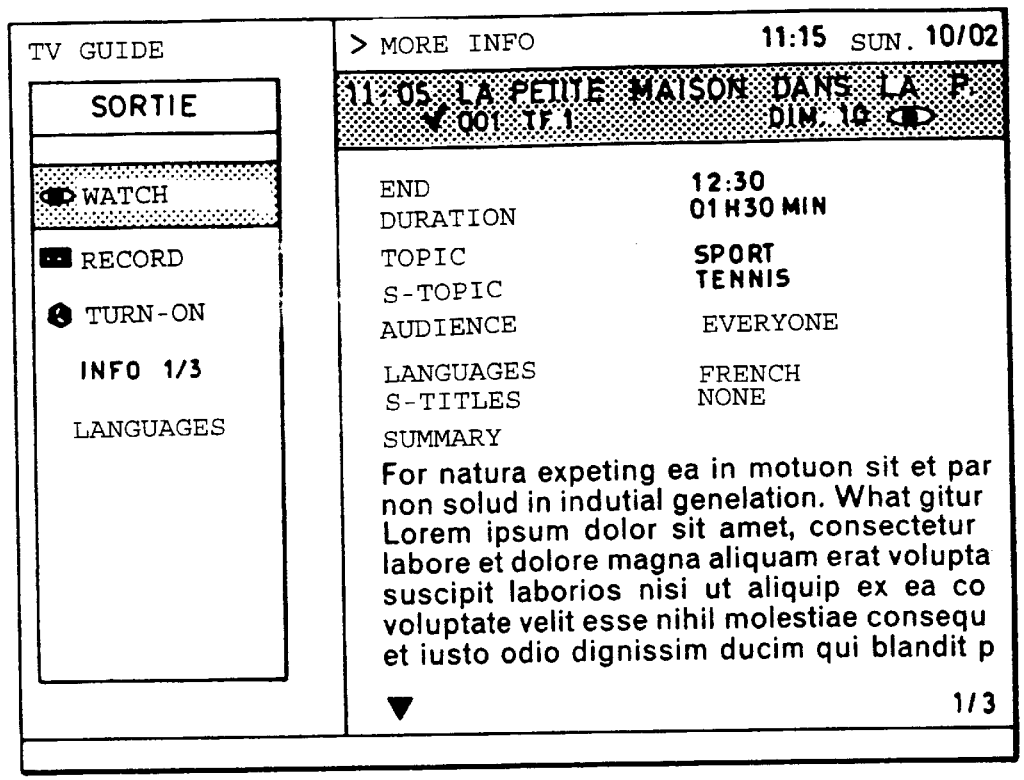
FIG. 4 represents diagrammatically the appearance of the screen corresponding to a second sub-menu of the main menu ("More Information" function)

The corresponding menu is illustrated by the screen represented in FIG. 4. The arrangement of the zones is once again identical to that of FIG. 1, a control menu appearing in zone 2, whilst the information per se is displayed in the display zone 3.

In this context the display zone 3 comprises a zone for recalling three lines of information already presented at the "Contents" menu level. It will be noted that an additional line has been provided for the title, given that the space available at the level of this sub-menu is greater. The presence will also be noted of the icons mentioned above: an eye for storage, a cassette for recording, a hook for storage and a clock for turn-on.

The remainder of the display zone comprises the following information: the finish time, the duration, the selected audio language, the language of the subtitles as the case may be, the topic in full, the sub-topic, the audience for which the event is intended (adults, adolescents, children, everyone etc.), as well as a summary of the event.

The last line indicates the page index if several pages are required to display the information, and especially the summary of the event.

In this sub-menu the display zone is used solely to present information. It is not possible to select therefrom or to activate therein any information item, since none of these items is a function or an event.

All the functions for acting on the event displayed are grouped together in the control zone. They are manipulated in a similar way to the functions of the "Contents" menu.

The "Language" function grants access to an additional sub-menu for choosing the audio language and subtitles. This sub-menu is not illustrated.

Lastly, the "Info" function makes it possible to scroll the various pages available in the display screen. This scrolling can also be done with the help of the "P+" and "P−" keys of the remote control.

The "Store", "Record" and "Turn-On" functions, each of which is preceded by its associated icon, are simply toggle functions whose state is reflected by virtue of the icons of the display zone.

A "Purchase" function appears for pay events, the duty for which has not been paid.

The "Store" function makes it possible to warn the user of the start of an event when the television set is on. If a stored event starts, the corresponding icon appears on the screen, for a duration of five minutes, overlaid on the programme being watched by the user. Actuation of any key of the remove control will cause the icon to disappear.

The "Record" function programmes the recording of the event.

The "Turn-On" function makes it possible to switch on the television set when the relevant event starts. The "Turn-On" function does not appear if the selected event is in progress.

A stored event intended to be recorded or programmed in order to wake the user will appear in the list of stored events (see below). Once an event has concluded, this event is deleted from the list.

When the event is a current event, the "Store" function is replaced by a "Watch" function, which when it is activated, reverts directly to the screening of the selected programme.

According to a variant embodiment, the icon for recalling the start of a stored event does not appear if the current event is recorded.

According to a variant embodiment, the naming of the toggle functions changes depending on the abovementioned state. For example, when the event is stored, the function "Store" becomes "Cancel".

Contents Menu—"Stored List" Sub-Menu

Figure 5:
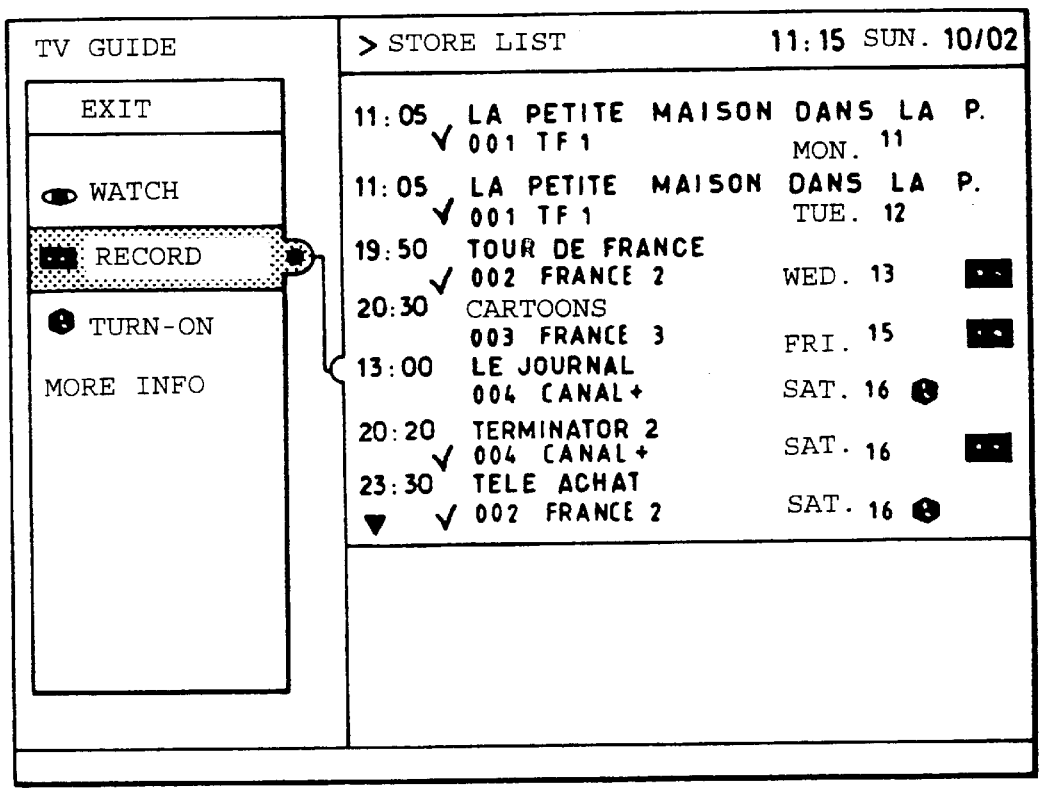
FIG. 5 represents diagrammatically the appearance of the screen corresponding to a third sub-menu of the main menu ("Stored List" function)

The "Stored list" function is activated from the "Contents" menu. The corresponding sub-menu is illustrated by FIG. 5. The name of the sub-menu is as for each of the previous sub-menus displayed in the recall zone 4.

Apart from this, the organization of this sub-menu is strictly identical to that of the "Contents" menu. Only the functions of the control zone change. The display zone contains only the events which have previously been selected by means of at least one of the functions "Store", "Record", "Purchase" or "Turn-On" of another menu.

According to a variant, the naming of the functions in the control zone changes according to the state of toggle of these functions at the level of each event as defined by Table 1:

TABLE 1

| State<br>Function | Activated | Deactivated |
| --- | --- | --- |
| (Handkerchief Icon) Store | (Icon) Store | (Icon) Cancel |
| (Cassette Icon) Record | (Icon) Record | (Icon) Cancel |
| (Clock Icon) Turn-On | (Icon) Turn-On | (Icon) Cancel |
| (Purchase Icon) Purchase | (Icon) Purchase | (Icon) Cancel |

The "More Info" function, already present in the "Contents" menu, is also available in the "Stored list" sub-menu, so that the user can make his decision to remove an event while having all the necessary information at his disposal, without having to go back up the menu tree.

Contents Menu—Record Function

This function, already presented within the framework of the "More Info" function is, according to the present example embodiment, available directly at the "Contents" menu level. This is in fact one of the most used functions. For the purpose of sparing the user fruitless manipulations, such functions acting on an event can be accessed at this level.

According to a variant embodiment, one or more among the following functions are directly available from the "Contents" menu: Record, Turn-On, Store. It is quite obvious that this direct access can be permitted only if the control zone can accommodate these additional functions.

Browsing Link Zone

The browsing link zone 7 is situated between the control zone 2 and the display zone 3. Although in what follows the description thereof is tied up particularly with the "Contents" menu (FIG. 2), this zone is employed in identical fashion each time a list of events is placed opposite a list of functions.

The usefulness of this zone is especially manifest when the two adjacent zones contain items organized vertically, as is the case in the present example embodiment.

Coming back to FIG. 2, it may be observed that there is a graphical link, in the form of a dash 8, between the selected function of the control zone and the selected event of the display zone.

At the first level of browsing, the "Left" and "Right" direction arrows make it possible to go from the control zone to the display zone and vice versa, whereas the "Up" and "Down" arrows make it possible to select a function or an event. The graphical link linking the selected function and event indicates at the level of which event or of which function each zone is entered. The graphical link also indicates the event to which a function will be applied in the case in which this function acts on an event. The user may move back and forth between the control zone and the display zone, selecting an item in a given zone, while always being aware of the selected item in the other zone, since both zones are displayed simultaneously.

Within the framework of the present example, the selected event and function are already distinguished graphically from the other items by altering their colour or luminance. The graphical link function is therefore redundant in this specific case. According to a variant embodiment, the graphical link of the browsing link zone 7 is alone used to designate the selected function/selected event.

It is quite evident that this graphical link can be generalized to more than two adjacent zones. The graphical link disappears for the screens in which browsing towards the display zone is not possible. This is the case for example when a filter is activated.

There is therefore always a selected event and, at the same time, a selected function. In this case, it is again necessary to be able to determine in which of the two zones, control or display, the cursor operated by the user is located at a given time.

Within the framework of the present example, this distinguishing function is fulfilled by a "token" 9 which is allocated graphically to one or other selected item. In the case of FIG. 2, the token is allocated to the "Channel" function. According to the present example embodiment, the token is placed beside the function or the event, in the browsing link zone. The graphical link always starts from this token.

According to a variant of the present example embodiment, two different levels of highlighting are used to distinguish on the one hand the selected event and function from the other events and functions, and to distinguish the activated item out of the two selected items.

More generally, an item (function or event) can be selected in each display zone. An additional graphical item will identify, out of these selected items, that over which the cursor is located, in this instance the item which would be activated if the enter key of the remote control were depressed.

If according to the present example embodiment, this graphical item is a graphical symbol appended to one of the selected items, the distinction is made, according to a variant embodiment, by varying the colour, typeface or luminance of this item.

According to a variant embodiment, when a change occurs in the events displayed following a modification of the values of the filters, the event selected by default is the first event in chronological order, and then in the order of the channels.

If according to the present example embodiment, the filtering functions and the functions acting on the events (information function, function for programming an action) appear in the same list of the main menu, the separating of the functions according to their nature into several lists is not excluded. For example, more than two lists can be arranged in parallel: a list of filtering functions, followed by a list of functions acting on the events, followed by the list of events themselves.

Moreover, if according to the example embodiment described above, the service data are extracted from a digital multiplex, the invention is not limited to such a form of transmission. For example, the transmission of service data by way of an analog television signal modulated appropriately (especially as regards the lines of the frame flyback interval) by said data is another form of transmission envisaged for the application of the invention.

What is claimed is:

1. A process for selecting an event in a video system comprising the steps of:
   displaying a first one-dimensional list of items representing events,
   displaying a second one-dimensional list of items in parallel with the first list representing a plurality of functions capable of acting on said events,
   selecting one of said plurality of functions by moving a cursor within the second list along the one dimension of said second list, and any one of said events by moving said cursor within said second list along the one dimension of said first list, wherein said selected function remains selected when said cursor is moved off the second list, and said selected event remains selected when said cursor is moved off the first list, and
   applying the selected function to the selected event upon activation of said selected function.

2. The process according to claim 1, wherein said plurality of functions represent the most used functions.

3. The process according to claim 1 wherein moving the cursor to a list brings about the positioning by default of this cursor over the most recently selected event from said list.

4. The process according to claim 1 further comprising the step of displaying a further list of functions for acting upon the selected event upon the activation of the selected event.

5. The process according to one of the preceding claims, wherein said functions capable of acting on the events comprise one or more from among the following functions: Record, Display complementary information, Turn-on, Storage in a recall list.

6. The process according to claim 4 wherein the displayed label of a function of toggle type varies as a function of its state.

7. The process according to one of the claims 1–3, further comprising the step of storing the events with which a function of toggle type in the active state is associated in a third list.

8. Device for reception in a video system including the transmission of service information, comprising:
   means for receiving said service information from a data stream,
   means for displaying a programme guide containing a first one-dimensional list of items containing events and a second one-dimensional list of items in parallel with the first list and containing a plurality of functions for acting on said events,
   means for controlling a cursor for selecting items by placing said cursor over an item; and
   means for displaying a signalling of the selected items, the selection of an item from a given list being maintained when said cursor is moved off this given list; and
   means for applying the selected function to the selected event upon activation of said selected function and for displaying a further list of functions for acting upon the selected event upon activation of said selected event.

9. Graphical interface for programme guide, said interface comprises a zone for displaying a first list of items containing events, a zone for displaying a second list of items and containing a plurality of functions capable of acting on said events, said interface furthermore comprising a cursor for selecting a function from said second list and an event on positioning said cursor thereat, the selection of an item from a given list being maintained when said cursor is moved off this given list, the activation of a selected function resulting in the application of the activated function to a selected event.

10. The apparatus of claim 8 further comprises means for displaying a further list of functions for acting upon the selected event upon activation of said selected event.

11. The graphical interface of claim 9 wherein the activation of a selected event results in the display of a further list of functions for acting upon the activated event.

12. The process according to claim 4, wherein said second list and said function list comprise common functions.

* * * * *